United States Patent
Pham

[19]

[11] Patent Number: 5,836,541
[45] Date of Patent: Nov. 17, 1998

[54] EASILY-CONVERTIBLE FIXED-WING ROADABLE AIRCRAFT

[76] Inventor: Roger N. C. Pham, 625 Veranda Ct., #1140, Grand Prairie, Tex. 75050

[21] Appl. No.: 859,732

[22] Filed: May 21, 1997

Related U.S. Application Data

[63] Continuation-in-part of Ser. No. 811,503, Mar. 5, 1997.

[51] Int. Cl.⁶ .................................................. B64C 37/00
[52] U.S. Cl. .................................... 244/2; 244/46; 244/49
[58] Field of Search .................................... 244/2, 46, 49, 244/135 R, 1 R, 100 R, 102 R, 50

[56] References Cited

U.S. PATENT DOCUMENTS

| | | | |
|---|---|---|---|
| 2,110,563 | 3/1938 | Thaon | 244/2 |
| 2,350,608 | 6/1944 | Griffith | 244/2 |
| 2,681,773 | 6/1954 | Rethorst | 244/2 |
| 2,692,095 | 10/1954 | Carpenter | 244/49 |
| 3,986,686 | 10/1976 | Girard | 244/7 A |
| 4,269,374 | 5/1981 | Miller | 244/2 |
| 4,720,061 | 1/1988 | Abdenour et al. | 244/46 |
| 4,881,701 | 11/1989 | Bullard | 244/2 |
| 5,050,817 | 9/1991 | Miller | 244/2 |

*Primary Examiner*—Galen L. Barefoot

[57] ABSTRACT

A fixed-wing four-seat light aircraft that can be easily converted to a roadway vehicle within minutes by a single person in the field, comprising a one-piece wing center panel with foldable wing tips on each sides. The whole wing unit is then rotatably mounted on top of the fuselage. The aircraft features a conventional front-engine-and-propeller lay-out, with a short fuselage for convenient roadability and garageability, with horizontal stabilizer of significant span with foldable tips for adequate flight stability. The vehicle has a low ride-height with a low center of gravity, four wheels with independent suspension, nose-height leveling for take-off and landing, and anti-sway mechanism for adequate ground handling. Ground propulsion is by automotive-style transmission driving the front wheels.

18 Claims, 8 Drawing Sheets

EASILY-CONVERTIBLE FIXED-WING ROADABLE AIRCRAFT

CROSS-REFERENCE TO RELATED APPLICATION

This application is a continuation-in-part of application Ser. No. 08/811,503, filed on Mar. 05, 1997 entitled, "Rapidly Convertible Roadable Aircraft."

BACKGROUND OF THE INVENTION

1. Field of the Invention

In general, this invention pertains to convertible fixed wing aircraft of the type that can be flown as a conventional fixed wing aircraft, and can be easily converted to an automotive street vehicle in order to arrive at one's final destination quickly and conveniently without having to transfer to a ground vehicle at the airport.

More particularly, the means to arrive at easy conversion from aircraft mode to automobile mode involves, quite simply, folding of the wing's outboard tips portion overlapping the center wing section, and rotation of the wing from a transverse orientation with respect to the fuselage or body to a longitudinal orientation whereby the vehicle's width is less than the maximum legal width of eight feet (2.44 m), without requiring any dissembly of any parts including wing, tail or fuselage that may be potentially inconvenient and time-consuming.

2. Discussion of the Prior Art

The idea of a single vehicle that can function as an aircraft to cover long distances in the shortest time, and then as a highway vehicle that can be driven from the airport to the ultimate destination, is an attractive one. However, there are many problems that make this ideal concept difficult to realize, and while many have attempted to design such a vehicle, there has never been a successful product that has reached the market.

The problem has been in integrating the functions and structural requirements of the two vastly different vehicles into a single, user-friendly construction that requires a minimum of human intervention in switching from the automotive to the aircraft configuration. The technological bases for both individual systems are highly developed, and it is necessary that this high level of technology for both systems be incorporated in a single system while maintaining the performance of these different systems.

The structural design requirements for an aircraft are quite different from those of an automobile, particularly in the matter of weight and aerodynamic resistance, which must be held to the minimum level, whereas in an automobile, weight and aerodynamic streamliness are not nearly as important consideration. The aerodynamic drag of an automobile body is many times that of an airplane fuselage, due in part to the unstreamlined underbody, with all of the exposed power transmission and suspension gear. Instead, in the automobile, ground handling and comfort especially smoothness and quietness are much more highly stressed, whereas in the light aircraft, ground handling is particularly poor especially in windy condition, and that the cockpit noise and vibration level in these aircrafts are quite objectionable to the non-enthusiasts.

The overall length of the automobile is made as short as possible in order to facilitate parking and maneuverability, whereas the aircraft's fuselage is much longer in order to provide adequate pitch damping and control authority necessary to be certified for production under FAA regulation part 23.

For an air-ground convertible vehicle that is reasonably operable in both modes, a great deal of compromise must be made among above factors, such that the final product up to now has been inefficient and has inferior flying characteristic in comparison to a production aircraft, at the same time requiring considerable amount of assembly or dissembly of wings, fuselage and tail section during the conversion.

The case in point is the well publicized effort of a major aircraft company Consolidated Vultee in 1947 in which an automobile body is attached to a wing-engine-tail assembly for flying and to be completely detached from this assembly for ground travel mode. Due to the aerodynamically inefficient automobile body as well as excessive weight because the automobile portion contains its own engine and transmission for ground travel, the final Convair Model 118 ConvAirCar of 1947 flew poorly with cruise speed of only 125 mph (200 km/h) and after a non-fatal crash in Nov. 1947, the program was cancelled.

After the obvious inconvenience of the ConvAirCar in which the wing and tail must be left behind at the airport in its roadable mode, another highly publicized project, that of Mr. Molt Taylor's Aerocar I, improved on the ConvAirCar due to its ability to trailer its own wings, tails and the tail half of the fuselage. The Aerocar is only one of two roadable aircraft designs ever certified by the FAA for limited production status. Mass production of the Aerocar was almost begun by Ling-Temco-Vought company of Dallas, Tex., but was cancelled due to insufficient pre-production orders. Considerable efforts of at least two persons is required in order to assemble the wings, fuselage and tail prior to flight, and that this conversion can only be carried out in calm to light wind only. One of the owner of one of four Aerocar I prototype ever produced, Mr. Ed Sweeney stated that he is not keen on trailering the wings and tails, that he does not want to do it very often and that he has spent sometimes 45 minutes in converting the Aerocar from its street-legal mode to its flight-ready configuration.

A third well-publicized attempt at overcoming the deficiencies of prior aircar projects is the very recent project of Ken Wernicke's of Sky Technology in Hurst, Tex. Wernicke's design sidesteps car-to-plane and plane-to-car transformations by using low-aspect-ratio wings that are wider than they are long. Elaborate winglets on the end of the broad wings boost aerodynamic efficiency and make the Aircar about as wide and as long as a bus, at 8.5 ft (2.6 m) in width and 22 ft (6.7 m) in length for the 2-seater version. Even then, Wernicke's own wind tunnel data, which is disclosed in U.S. Pat. No. 5,435,502, reveal that his design's maximum lift to drag ratio (L/D) is only 7.5 at lift coefficient of only 0.3, which is only a little more than ½ of the L/D of conventional private aircraft. The L/D got much worse, however, at higher lift coefficient that is required at take-off and landing speed, in which case, a lift coefficient of as much as 1.4 to 2.6 is required for take-off and landing at smaller municipal airports. At the lift co-efficient above 1.0, the L/D of the Aircar gets less than 2, whereas in a conventional aircraft at this lift co-efficient the L/D remains around 10. This means that Wernicke's Aircar will require much more power at the slow flight speed at take-off and landing, will not be able to achieve a reasonable service ceiling due to its tremendously high induced drag at higher wings lift coefficient, and that when the engine quits it will literally fall like a brick when turning or slowed down prior to landing. This certainly does not inspire pilot's confident in a single engine aircraft's ability to survive a power-off (or dead-stick) landing. There are other questions regarding Wernicke's design with respect to pitch and roll stability in an aircraft without a horizontal stabilizer and with such a short wing span, and questions regarding its ground handling in a tricycle configuration with such a high center of gravity off the ground and such tall winglets far aft of the center of gravity.

Among those less well publicized roadable aircraft designs, including at least 76 patented designs granted between 1918 and 1993, none has been able to simultaneously solve the large number of problems inherent in a typical roadable aircraft design such as excessive weight, aerodynamic inefficiency and poor stability in comparison to a typical light airplane, time and labor-consuming conversion between ground and air modes, poor ground handling in comparison to a typical automobile, and excessive complexity that translates into increase in production and maintenance cost as well as unreliability.

The prior art also includes various patents of sub-class 244/46 disclosing fixed wing aircrafts with mechanism for wing rotation 90 degrees with respect to the fuselage. To my knowledge, none of those are roadable aircrafts. They are either supersonic fighter such as in U.S. Pat. No. 4,998,689 of Woodcock, U.S. Pat. No. 3,971,535 of Jones and U.S. Pat. No. 3,155,344 of Vogt. All these designs involve wing rotation during flight therefore utilizes heavy and complex turet mechanisms capable of withstanding the full stresses in flight that are not adaptable to the lighter roadable aircraft that does not need to rotate its wing while flying. Other wing rotation mechanisms in the prior art are designed for much larger commercial or military transport aircrafts that must rotate their wing only for compact storage purpose. Their mechanisms are also too complex and too expensive for use in a light personal aircraft. For examples, Rumberger et al. of U.S. Pat. No. 5,337,974 discloses a wing rotation mechanism for storage of the V-22 tilt-rotor aircraft involving a large diameter unitary ring structure as the wing bearing. This large ring structure must be precisely shaped, which involved high cost and inherently give rise to lots of friction during wing rotation, therefore wing rotation powered by the muscle strength of a single operator is difficult, not that this necessary or even desirable in its role for the very large and expensive tilt-rotor aircraft. Furthermore, Rumberger's design does not provide for a mechanism of wing to fuselage sealing, thus requiring very high production tolerance of the rotating surfaces involved thus further increases cost, but in a government contracted defense-related project, cost concern is perhaps not a high priority. Nor does Rumberger's design provide for vibration damping between the wing and the fuselage, perhaps causing more fatigue and wear on the metal parts involved.

Furthermore, to my knowledge, there has been no disclosure involving aircraft of any kinds that involves together the folding wing tips and wing rotation mechanisms as will be disclosed in this invention. Yet, this combination is crucial for a roadable aircraft with wing span sufficiently large for practical useful loads capacity and economical flying, and allowing such an roadable aircraft to have the conventional front-mounted propeller that has been proven in nearly 100 years of aviation history to be the most practical configuration.

SUMMARY AND OBJECTIVES OF THE INVENTION

It is a main objective of this invention to disclose a new and improved air-ground vehicle design that can be easily converted from aircraft to automobile configuration, or vice versa, without manual structural modification, and having permanently connected control systems that are conventional for both aircraft and automobile use, that is capable of flying as well as a typical modern high performance private aircraft and also capable of traveling in public roads with ground-handling, comfort and stability as good as a typical modern automobile.

It is another objective of this invention to disclose a roadable aircraft that can carries at least four adult occupants with full luggages and yet is still compact enough to fit a standard size automobile garage as well as as standard size automobile parking slot.

It is another objective of this invention to disclose mechanisms for rapidly converting an air-ground vehicle between its two modes that are extremely simple, light in weight, reliable and low in cost.

It is another objective of this invention to provide for a cockpit system for controlling such an air-ground vehicle that is familiar to both airplane pilots and car driver so as to minimize any potential for erroneous control input from pilots previously trained in a conventional aircraft.

It is another objective of this invention to disclose a new and improved aircraft that is more resistant to lost of control or over-turning (flipping over) when taxiing on the ground due to cross-wind and wind turbulent and yet has the same capability for short-runway take-off and landing as a typical single engine private aircraft.

Further objects and advantages of this invention will become apparent from a consideration of the drawings and ensuing description.

In summary, in order to achieve all the aforestated objectives, the roadable aircraft of this invention embodies a one-piece wing center section with the wing tips foldably overlapping this center section. Thus folded, this wing unit is then rotated 90 degrees on the top of the fuselage in order to overlap the vehicle fuselage for ground travel. The result of this is that wing aspect ratio of at least 7:1 is achievable for adequate aircraft performance, at the same time allowing a conventional aircraft propeller to be mounted in the nose of the aircraft for maximum simplicity and reliability. The aircraft's fuselage is short in order for it to fit in a home garage, therefore a large-span but foldable horizontal stabilizer is provided for adequate pitch stability. For maximum ground handling, four wheels with track width of at least 7 feet (2.1 m) are used instead of three wheels in a typical aircraft, completely with independent suspension and shock absorption system as well anti-sway mechanism. For ease of controlling in the ground, an automobile style steering wheel is mounted in the usual position. Ground acceleration and braking is done via accelerator pedal and brake pedal also in the usual position. Rudder control is via a pair of rudder pedals mounted on both sides of the brake pedal. Roll and pitch control is via a joy stick mounted in the area between the two front seats (same location as would a manual stick shift be placed) in order to be accessible to both front seat occupants in case of emergency.

DESCRIPTION OF THE PREFERRED EMBODIMENTS

FIG. 1a through FIG. 1d show the general layout of the main embodiment of this invention. The vehicle is designated in its entirety by the reference numeral 1, and comprises a conventional front-engined-and-propellered general aviation aircraft fuselage 3 which is about 20 ft in length (6 meters), or 20% shorter in length than a typical 4-seat light aircraft.

This reduction in length is essential for roadability and garageability but has added advantage of reduction in aerodynamic drags and weight.

Mounted on top of the fuselage is the wing unit 4. The wing unit 4 is rotatable with respect to the fuselage 3 allowing the wing unit 4 to be aligned with the fuselage in the roadable mode. The wing unit 4 is also foldable into it-self on both sides half way between the wing root and wing tips, allowing maximum wing span of about 30 ft (9.1 m). With wing area of 130 square feet (12 m$^2$), the wing aspect ratio is almost 7:1 which is comparable to general aviation aircrafts. Details of mechanism of wing rotation and wing folding will be discussed subsequently.

Figure 1A:
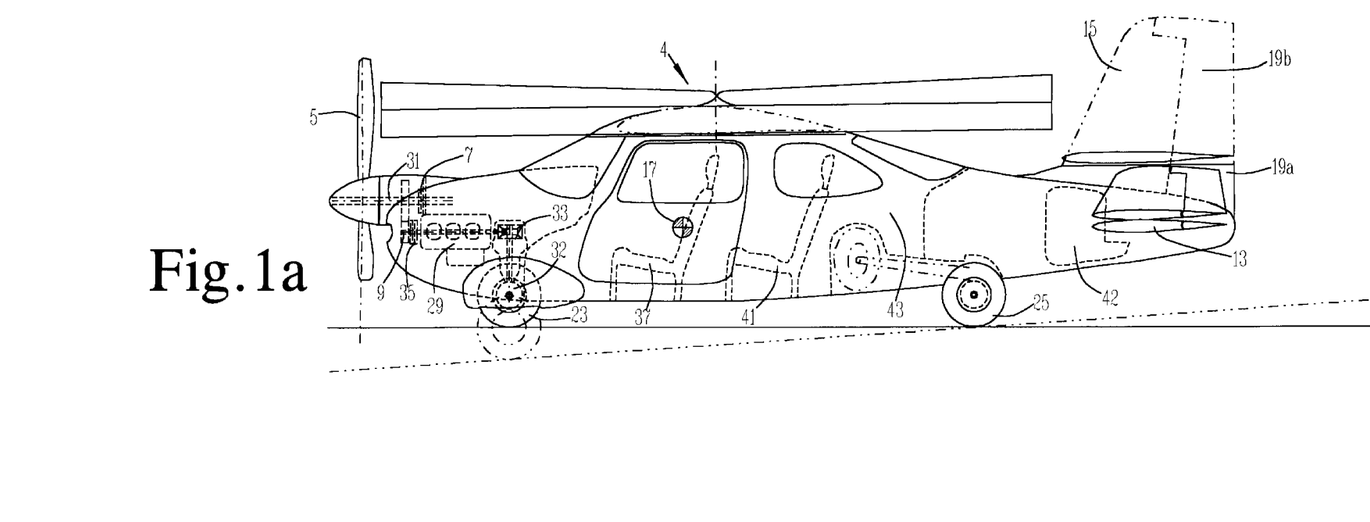
FIG. 1a, FIG. 1b, FIG. 1c and FIG. 1d are top plan view, side elevation, front view and rear view respectively of the air-ground convertible vehicle of this invention.

Propulsion in the air mode is via a conventional three-bladed 76 inches diameter (1.93 m) constant-speed propeller unit 5. Propeller 5 is attached to prop shaft 31 which is attached to the propeller-speed-reduction unit (PSRU) 9. Behind the PSRU 9 is the propeller brake unit 7 designed to lock the propeller in-place as shown in FIG. 1a in order to provide ground clearance for the roadable mode. Motive power for both air and road modes is supplied by engine unit 29, preferably a very compact engine of automotive origin, six-cylinder horizontally opposed (flat six) of aluminum block and head, liquid cooled, turbocharged with 3–4 liters displacement, with continous horsepower rating from 250–300 hp (186–223 Kw). Interrupting the engine's power connection to the PSRU 9 is the propeller clutch unit 35, in order to allow for engine power to transmit solely to the vehicle's automotive transmission unit 33 in the roadable mode while the propeller is locked in place.

Figure 1B:
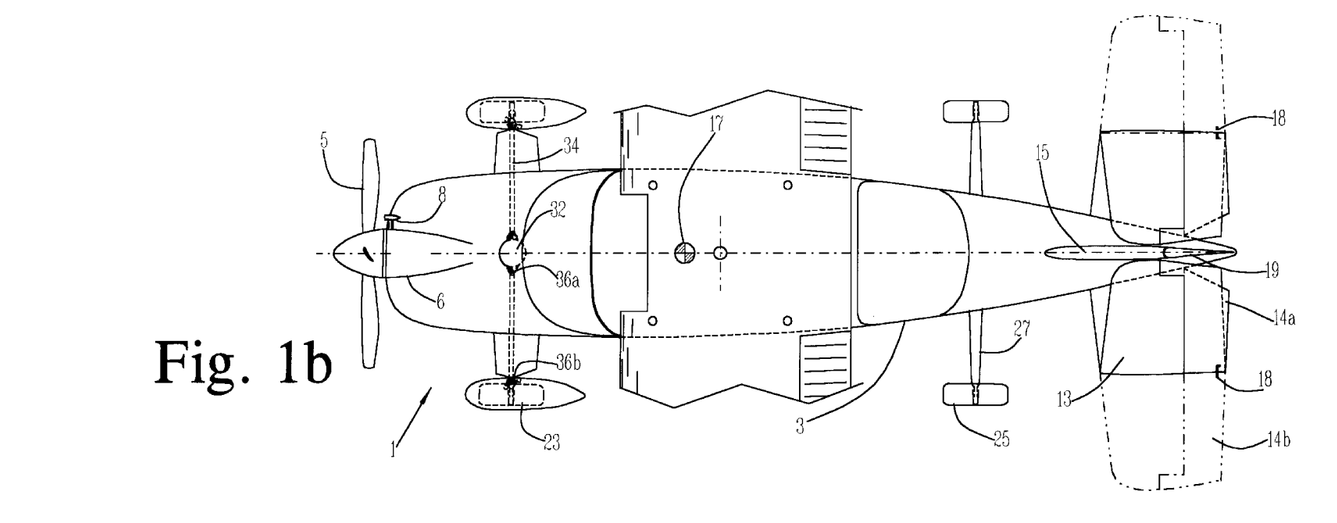

Transmission unit 33 is preferably a compact and lightweight unit, three-speed automatic, derived from a low powered sub-compact automobile hence is capable of handling 80 hp (60 Kw) This is adequate to keep up with road traffic given the vehicle's curb weight of no more than 2000 lbs (909 Kg). Therefore, it is very important that the engine power be intentionally limited to no more than 80 hp while the vehicle is in the roadable mode, preferably via electronic engine control means. Transmission unit 33 is mounted in the vertical orientation instead of horizontal as in automobile practice, hence modification in the transmission oil pan orientation is necessary. The transmission output shaft runs right into the differential unit 32 in the bottom of the engine compartment. Referring to FIG. 1b, it can be seen that power from differential unit 32 is transmitted to each front wheel 23 via drive axle shaft 34. On each ends of axle shaft 34 are constant-velocity (CV) joints 36a and 36b in order to allow vertical movement of each front wheel independently, hence independent suspension. More details on suspension system in later drawing figures.

Another feature very important for roadability is the quadricycle (4-wheeled) landing gear configuration instead of the tricycle configuration in conventional aircraft. Quadricycle configuration provides for better lateral stability against rolling over for a given wheel track width. Quadricycle configuration also permits placement of the center of gravity (CG) 17 further away from the wheel axles thus allowing good road handling, much greater stability in cross winds and against tumbling over in strong tail winds or forceful braking. In FIG. 1a, the CG 17 is almost 4 ft (1.2 m) behind the front wheels 23, which is the same respective distance in comparison to a compact size front wheel drive automobile. The enhancements in road handling also translate into a more desirable aircraft with respect to cross wind resistance, to narrow run way or to rough-field operation, and to enhancement in braking after landing hence shortening of landing distance. The front wheels 23 are equipped with nose-height-leveling mechanism in order to raise the nose up to provide for propeller ground clearance before a flight. The rear wheels 25 are mounted on spring steel landing gear legs 27 and are retractable into the fuselage 3 via mechanism similar to the main landing gear retractable unit from Cessna 182 RG, Cessna 210 Centurion or other high winged retractable Cessnas.

Referring to FIG. 1a, it can be seen that there is enough cabin space for at least four adult occupants in the front seats 37 and rear seats 41. Right behind the rear seats 41 is luggage room 43 as well as room for the retractable rear wheels. The rather limited space here may be an advantage from a safety standpoint. It discourages overloading the aircraft too much behind the CG 17 that can result in lost of control in the air mode. A typical aircraft designer may question the advisability of carrying four passengers in an aircraft with such a short fuselage, as the CG's range of travel with passengers and cargo loading behind the CG may well exceed the pitch control authority of the horizontal stabilizer 13 in such a short fuselage with short tail moment arm. This is a serious problem and may well be the deciding factor whether the aircraft is stable enough to be type-certificated under FAR part 23 or not. There is a two-part solution to this problem. Firstly, the aircraft's nose section is heavy because it contains not only the engine and propeller as in a conventional aircraft, but it contains also the PSRU 9, the propeller clutch unit 35, the propeller brake unit 7, the transmission unit, front wheel differential unit 32, as well as the complete front wheel suspension and nose height leveling mechanism. In addition to this, the vehicle's short tail section means reduced balancing moment for the heavy nose. Therefore, when loaded with only occupants in the front seats, the vehicle will certainly be nose-heavy, with the CG 17 moved as far forward as near the wing's leading edge. The vehicle is designed to be optimally balanced only when it is fully loaded, with passengers in the rear seats and luggages aft of the rear seats. However, it is known that a nose-heavy but lightly loaded aircraft is perfectly controllable in flight, at the expense of decrease efficiency in flight due to increase in induced drags at the horizontal stabilizer 13 having to produce more down force to balance the nose heaviness, and the down force in the stabilizer in turn adds more effective weight to the aircraft hence adding more induced drags in the wing 4. Secondly, ballast is therefore highly desirable in the tail section of the aircraft when it is in the nose-heavy condition. Ballast, however, is still extra weight to the aircraft that must be avoided. Therefore, the optimum solution is to use the aircraft's reserve fuel capacity as ballast for the tail section, contained in the tail section fuel tank 42. Designed to carry about 100–150 lbs (45–68 Kg) of fuel, its location gives it three times the moment arm compared to the moments of the rear cabin cargoes, hence it can replace 300–450 lbs of load in the rear compartments of the vehicle. Since the aircraft normally is not expected to use much of its reserved fuel, efficiency is not affected. Even in unexpectedly long flight when most of its reserve fuel is consumed, the aircraft is still controllable in the air. Efficiency is only affected toward the end of the flight when the reserved fuel is used up. It is very important however, to remember to pump dry the reserve fuel tank into the wing's fuel tanks when the vehicle is fully loaded in the rear compartment in order to avoid tail heaviness which can lead to stall and crash after takeoff. This activity should be a part of every pre-flight checklist.

Referring to FIG. 1a, it can be seen that in the roadable mode, upward visibility above the nose from the cabin is very poor, due to the rotated wing blocking the view. This will prevent the driver from being able to see the overhead traffic lights up close. Furthermore, although over-the-nose downward visibility is at an acceptable angle of 11° in level attitude, in the nose-up attitude during takeoff or landing, over-the-nose visibility is poor. To remedy this problem, referring to FIG. 1b, a high resolution video camera 8 is mounted right behind the propeller 5 on the right side of the propeller pod 6. This camera is swivelable up and down as needed depending on which air or roadable mode one is in. Image from this video camera is conveyed to the instrument panel's computer display monitor. This monitor may also be used to display navigational data, terrain map, weather map or other data as required, replacing the typical analog gauges used in the older generation of aircrafts. A special video camera may also be used to enhance night vision should the needs arise.

Toward the rear of the vehicle are foldable vertical and horizontal tails. Since the span of the horizontal tail 13 is almost 11 ft (3.3 m), it must be folded into itself on both sides for road clearance. The vertical tail 15 also must be foldable in order to minimize the destabilizing effect of strong cross wind in the roadable mode. Referring to FIG. 1d, the vertical tail 15 can be seen folded downward toward the right side, resting on a folded panel of the horizontal tail 13. Attachment means, for example, the use of bungee cords with hooks, should be provided in order to prevent unwanted flapping motions of the folded panels en route. The foldable tails are also advantageous for taxiing on the ground in strong winds before takeoff or after landing, in which cases, the pilot may elect to keep the tails folded until the aircraft is lined up with the run way (and the wind), ready for take off, or fold the tails right after landing when the aircraft is still aligned with the runway. The folding mechanism of the tails is similar to the wing's folding mechanism and will be discussed subsequently.

Figure 1C:
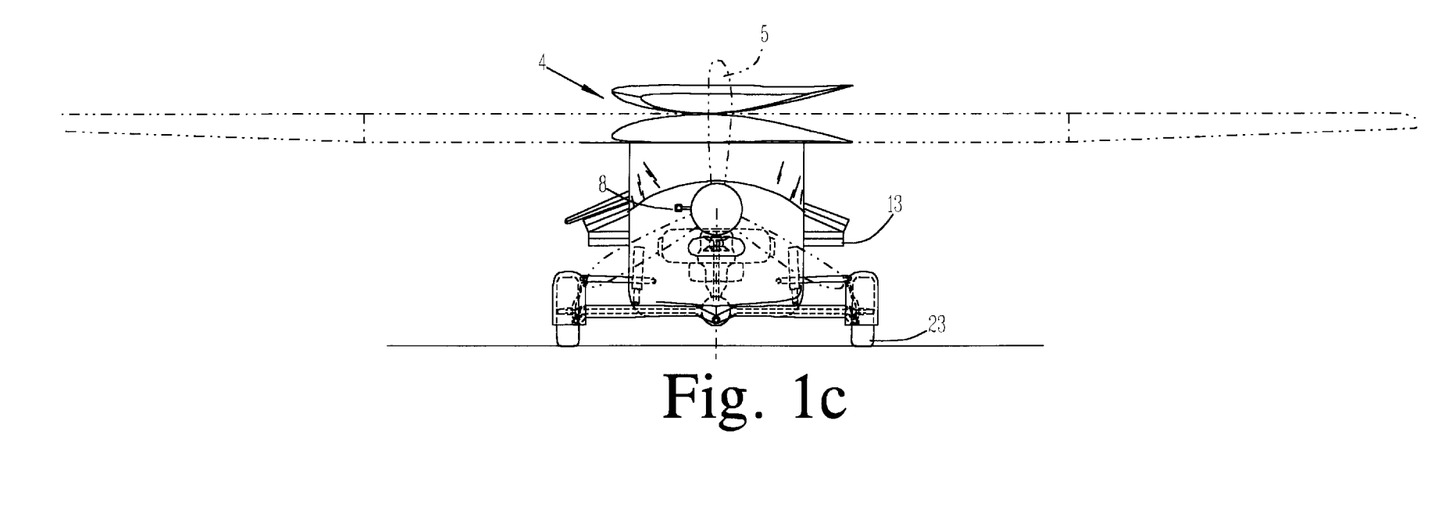
Figure 1D:
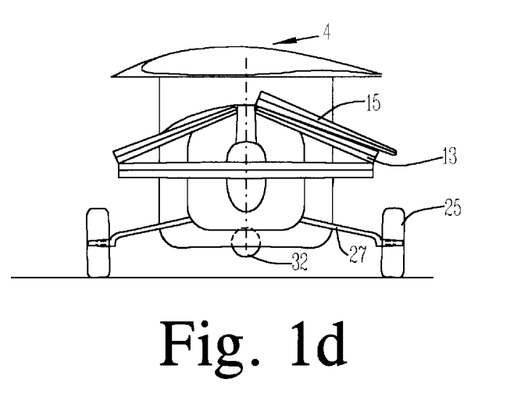

FIG. 1c is a frontal view of the air-ground vehicle, wherein the propeller can be seen in its locked-in position for road mode. The propeller's diameter is wide enough for it to touch the ground if not being locked in place. Over-the-nose downward visibility is actually not bad, but upward visibility is very poor and should be augmented by video camera 8. Even though the maximum width of this vehicle is only 7 ft (2.13 m) which is well below the legal limit of 8.5 ft in width for a road vehicle, it can be seen that the vehicle is quite stably planted on its wheels given the vehicle's low ride height, in comparison to conventional aircraft of similar dimensions. Given adequate 4-wheel independent suspension, shock absorption and anti-sway mechanism as will be subsequently discussed in details, this vehicle's road handling should be comparable to a typical automobile or mini-van.

Figure 2A:
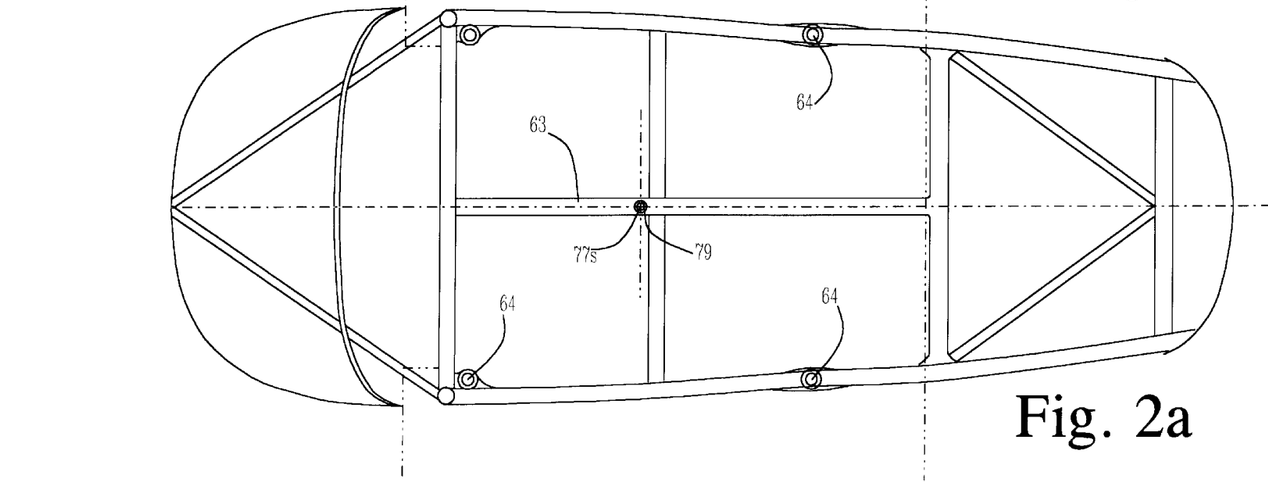
FIG. 2a, FIG. 2b and FIG. 2c are top plan view, side elevation and closed-up view, respectively of the wing mounting and rotation mechanism.
Figure 2B:
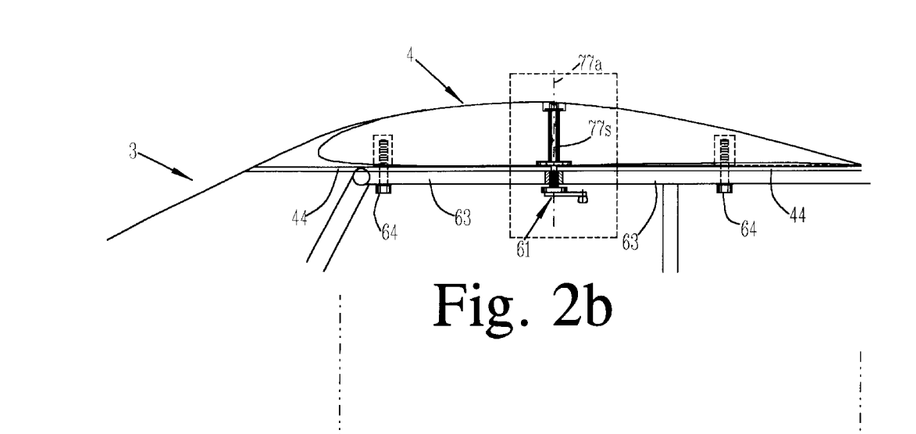
Figure 2C:
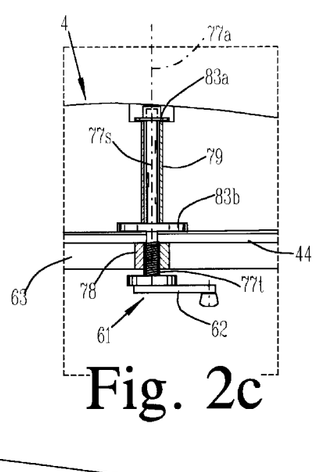

FIGS. 2a–c are closed-up details of the simple wing rotation mechanism. The wing 4 is rotatable with respect to the fuselage 3 on a vertical axis 77a on top of the fuselage in the center of the cabin. Referring to FIG. 2c, rotational axis 77a is surrounded by a channel 79 through the center point of the wing wherein traverses a smooth metal rod 77s, around which the wing rotates. Rod 77s is retained through the wing 4 bounded by lower disc 83b on the bottom end and upper cap 83a on its top end. Lower disc 83b supports the weight of the wing and also serves as lower bearing for rod 77s and is permanently welded to rod 77s while upper cap 83a is screwed on to the upper tip of rod 77s in order to allow for rapid removal of the wing 4 away from rod 77s and hence away from the fuselage. The junction between the top of the fuselage and the lower wing surface is lined with resilient pads 44 made from neoprene rubber. The resilient pad 44 acts not only as seals but also as vibration damper in order to reduce transmission of vibration from the fuselage to the wing that can cause premature wear to the wing attachment and folding mechanism. The resilient pad 44 is coated with a smooth vinyl or teflon layer on the exposed surface in order to reduce friction during wing rotation. Even so, due to the considerable weight of the wing plus any fuel that may be contained in the wing, considerable resistance to wing rotation will develop that can cause premature wear on the smooth coated surface of the resilient pad 44. Therefore, it is better to unseat the wing from the resilient pads by a few millimeters just prior to wing rotation by means of a hand-cranked jack 61. Jack 61 is formed by a crank 62 bolted to a threaded rod 77t. Rod 77t is fixedly attached underneath of lower disc 83b, hence it too supports the weight of the wing unit 4. Rod 77t is threadedly journaled through a correspondingly threaded bearing 78 that is attached to the fuselage beam 63, whereby cranking a few turns on crank 61 will cause a slight vertical movement of wing 4 with respect to the fuselage 3.

After completion of 90° rotation, the wing should be tightly seated against the fuselage via cranking action on jack 61. Referring to FIGS. 2a and 2b, the fuselage is then firmly bolted to the wing by four large bolts 64 from inside the fuselage. A torque wrench should be used to tighten the bolts 64 each time with specified amount of torque for safety reason.

Figures 3A, 3B, 3C:
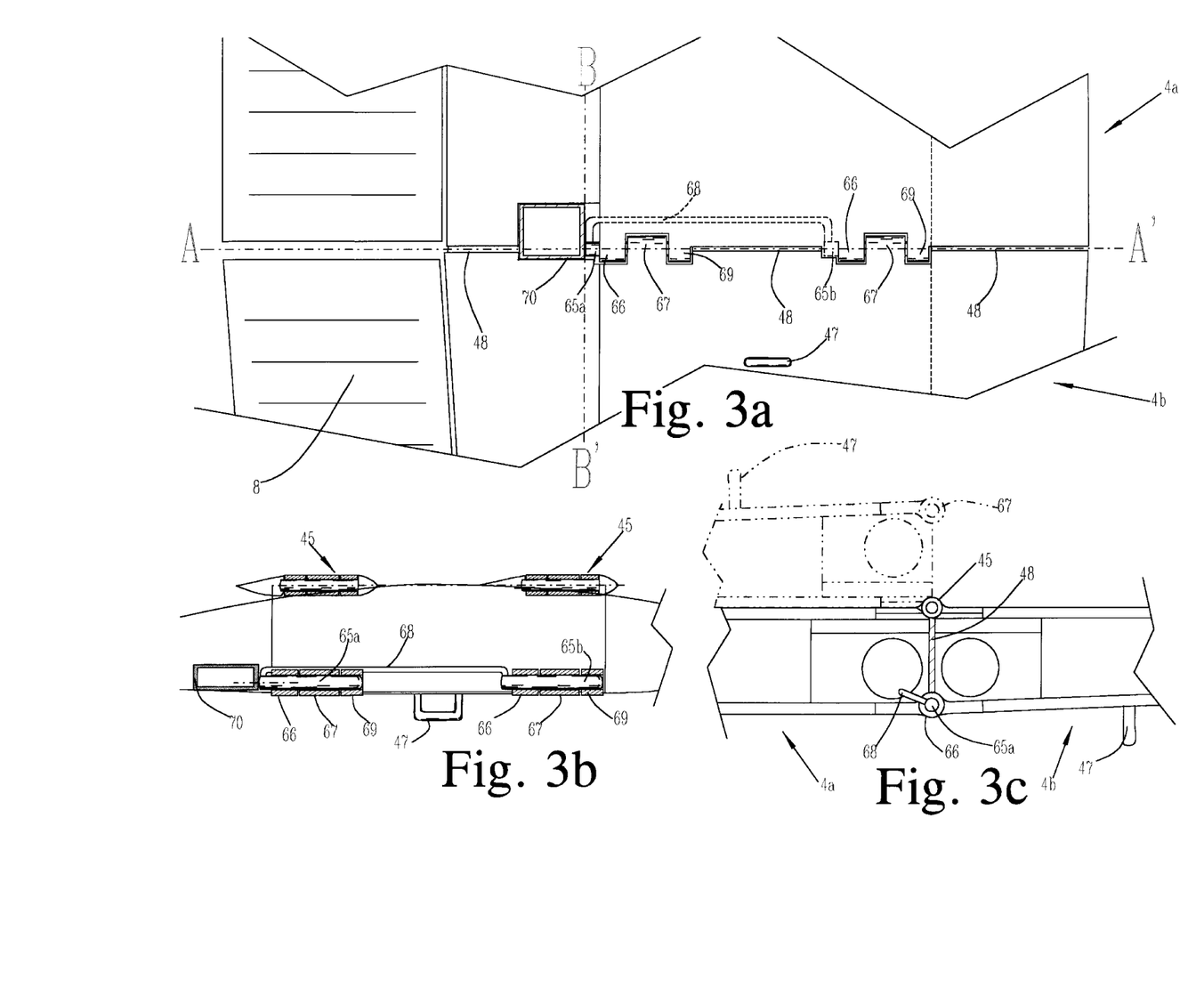
FIGS. 3a, 3b, 3c are the top plan view, side cross-section and front-rear cross-section, respectively of the wing tip folding mechanism.

FIGS. 3a, 3b and 3c illustrate details of the folding mechanism of the wing tips and the tail tips. FIG. 3a is a plan view of the bottom surface of the junction between the wing's center panel 4a and outer panel 4b. Referring to FIG. 3c, which is a vertical section of FIG. 3a along line B—B', the outer wing panel 4b is foldable 180 degrees around hinge 45 in order to overlap on top of inner wing panel 4a in the roadable mode. When thus folded, the wing panels should be strapped together with bungee cord or other mechanism in order to prevent unwanted movements. To unfold the wing prior to a flight, the straps are removed. Then, the operator will grab onto the outer wing panel 4b via handle 47 and pull the outer wing panel 4b 180 degrees downward to the wing's extended position. Using one hand to pull down on handle 47 in order to compress against a resilient layer 48 placed between the two wing panels 4a and 4b, the operator will use the other hand to slide the locking pins 65a and 65b through locking cylinders 67 belonging to the outer wing panel 4b and through locking cylinders 69 belonging to the inner wing panel 4a in order to lock the two wing panels together on the bottom surface of the wing, thereby allowing the wing panels to remain rigidly in extension. Referring to FIG. 3b, which is a vertical section of FIG. 3a along line A—A', the front locking pin 65b and the rear locking pin 65a are preferably connected together by a rigid metal rod 68 allowing synchronized movements of both pins. Once the locking pins are in their locking place, their positions are secured by a spacer box 70 that is latched removed before surface of the wing. Spacer box 70 must be removed before the locking pins can be disengaged from their locked positions.

Similar mechanism may be employed for the foldable tail surfaces. Also, referring to FIGS. 1a and 1b, the tail control surfaces, comprising the elevator inner panel 14a and outer panel 14b and the rudder upper panel 19b and lower panel 19a are similarly connected with locking pins 18 slidable from the inner panel to the outer panel so as to allow both inner and outer panels to move synchronously in respond to control input from the pilot.

With the wing thus rotated and folded, the control of the aileron surfaces 10 (FIG. 3a) via cable mechanism as commonly done, may be more difficult, and may be replaced by hydraulic or electric control means. Electrical aileron control is more advantageous if the wing is to be detached away from the fuselage frequently, for the purpose of improvement in road handling, or for ground travel in strong cross winds. The wing can be very easily detached from the fuselage, with removal of only one nut 83a, disconnecting the fuel lines by removing of wire clamps, and disconnecting electrical connections. The wing is then hoisted toward the garage's ceiling by chains on pulley, and it can be stored at the airport for a small fees, until it is again needed for flying. Alternatively, if the use of this vehicle becomes widespread, the wing may be available on a rental basis, at the airport, thus allowing one to select the size of wing as appropriate to the amount of loads one is carrying. Smaller loads require smaller wings, which yield faster airspeeds, smoother turbulence penetration, and improvement in tail surfaces authority due to increase in tail-volume coefficient.

Figure 4A:
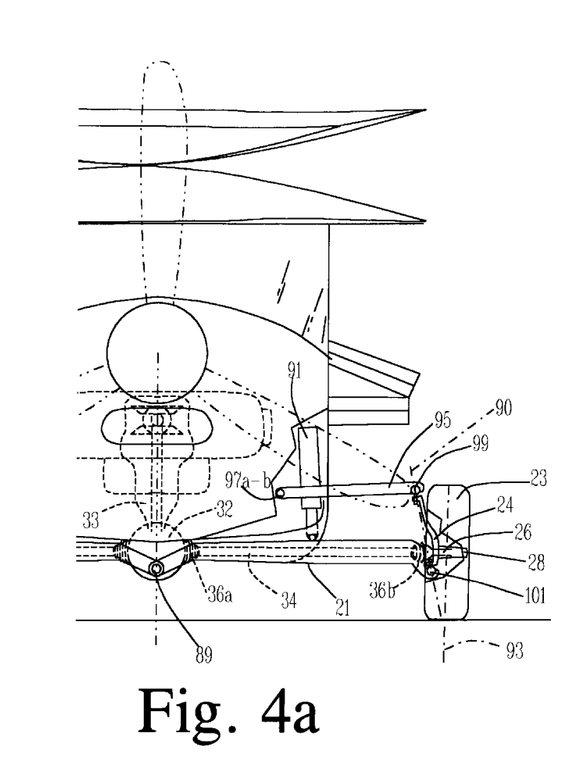
FIG. 4a and FIG. 4b are the front view and top plan view, respectively, of the front wheel suspension mechanism.
Figure 4B:
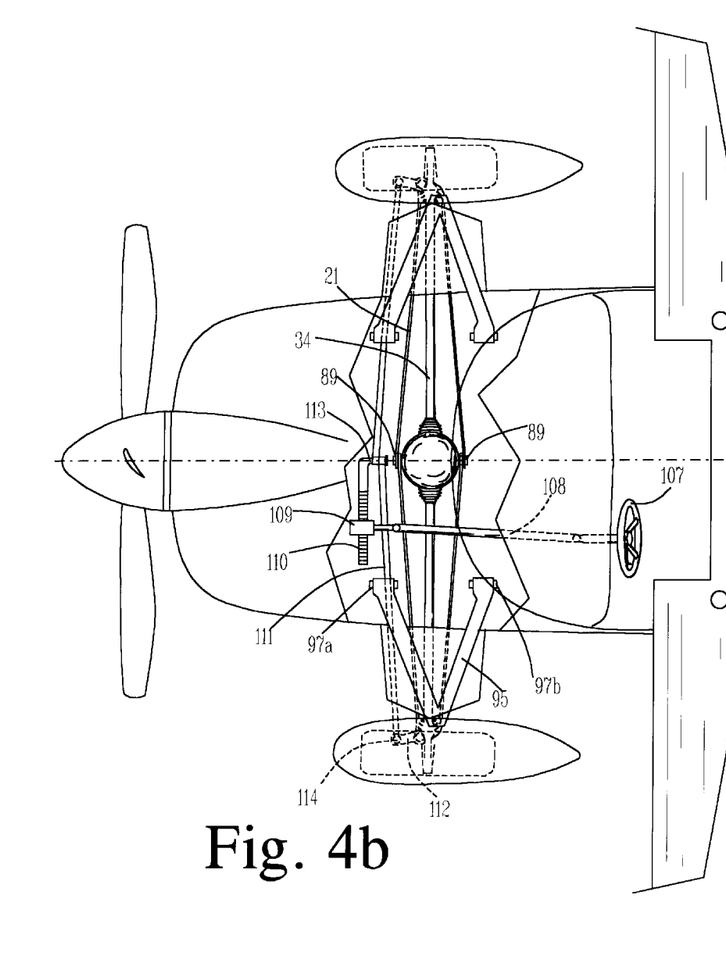

FIGS. 4a and 4b illustrate details of the vehicle's all-combined front wheels drive, steering, suspension, shock absorption and nose-height leveling system.

Referring to FIG. 4a, this system is derived from the well-proven automotive short-long arm (SLA) design in which the upper control arm 95 is considerably shorter than the lower control arm 21. The lower control arm 21 articulates with the fuselage at longitudinal axis 89 near the bottom of differential unit 32 and control arm 21 articulates with the wheel 23 via ball joint 101. Lower control arm 21 is supported by suspension strut 91. Strut 91 is also used to power the vehicle's nose-height leveling system and details will be subsequently discussed. Referring to FIG. 4b, upper control arm 95 is V-shaped and articulates with the fuselage via hinge joints 97a and 97b, and with the wheel via upper ball joint 99 as shown on FIG. 4a. Attached to ball joints 99 and 101 is the steering knuckle 24 wherein the steering spindle 26 and wheel bearing 28 are attached. An imaginary line drawn through upper ball joint 99 and lower ball joint 101 represents the steering axis 90. In this case, the steering axis 90 is offset a predeterminable degrees from vertical, also referred to in automotive language as "steering axis inclination," in order to improve steering self-returning tendency and to reduce tire scuffing in rough roads. Also to further assist in this regard, the front wheel camber alignment 93 is set with 1–1.5 degrees of positive camber in the roadable mode. In the roadable mode, the front wheel is driven by engine power transmitted to transmission unit 33 through differential unit 32, through CV joint 36a to drive axle shaft 34 to another CV joint 36b finally to front wheel 23.

Referring to FIG. 4b, the vehicle's steering system is a very simple non-powered but well proven rack-and-pinion steering system. Rotational movement from steering wheel 107 is transmitted by steering shaft 108 to pinion gear box 109 at the end of shaft 108. Pinion gear box 109 is mated to steering rack 110. Rack 110 is then connected to steering rod 111 via hinge joint 113 placed in nearly the same longitudinal axis as that of hinge joint 89 therefore preventing unwanted steering input as the result of the lower control arm 21 flapping motion on axis 89. Steering rod 111 is connected to steering arm 112 via ball joint 114. Steering arm 112 is a part of steering knuckle 24. Please note the absence of the U-shaped anti-sway (or stabilizer) bar that is so ubiquitously found in automobile practice. This is due to the large range of vertical travel of the front wheels thus necessitating a rather large and heavy anti-sway bar in this very weight-sensitive vehicle. Instead, a hydraulic type of anti-sway mechanism may be used, as will be subsequently illustrated in the section on rear wheel suspension.

Figure 5A:
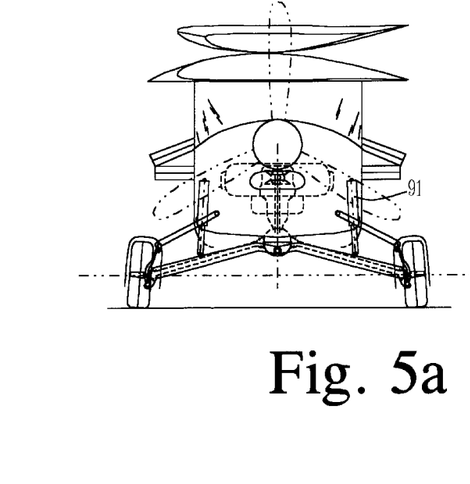
FIG. 5a and 5c shows a front view and side elevation view respectively of the vehicle with the front wheels jacked-up prior to take-off.

FIG. 5a shows the jacked-up position of the front wheels allowing for propeller clearance from the ground. It can be seen that suspension strut units 91 are expanded in order to jack-up the nose section of the vehicle. According to FAR part 23, propeller clearance must be at least 7 inches (17.8 cm) for tricycle type of landing gear. Since quadricycle configuration is superior to tricycle landing gear, the propeller clearance of 7.5 inches (19.1 cm) for this vehicle as shown on FIG. 5c probably would satisfy federal regulation.

Figure 5B:
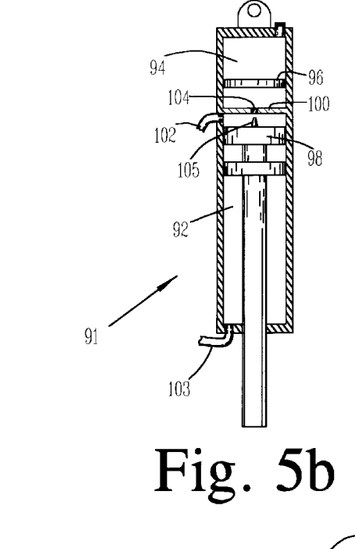
FIG. 5b shows internal construction of a oleo-pneumatic strut used for suspension and nose-height leveling.
Figure 5C:
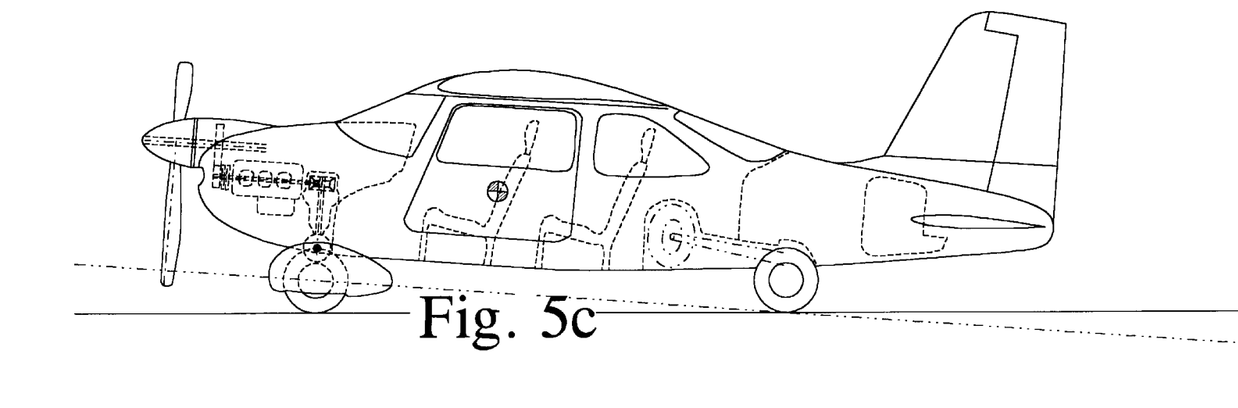

Referring to FIG. 5c, the vehicle is shown in its flight-ready form. Jacking-up the aircraft's nose from the front wheels rotates the aircraft 4 degrees from horizontal. This, plus 3–4 degrees of built in incident angle in the wing attachment, means that up to 8 degrees of angle of attack is available for takeoff. Although this is well below the stall angle of attack for most airfoils, in the case of high camber high lift airfoil sections with the use of slotted flaps (at aspect ratio of 7:1), about 80–90% of maximum lift coefficient is available at 8 degrees angle of attack. Even for the unflapped outer wing panels, 70–80% of maximum lift coefficient is available. This means that the aircraft will rise itself off the ground at airspeeds only ~15% higher than its stall speeds, with good safety margins. This also means that after landing at appropriate airspeed margins with a gentle flare-out, the aircraft will exhibit no tendency to bounce back up.

In FIG. 5b, there is shown internal details of the modified oleo-pneumatic strut unit 91. This is basically a two-chamber design wherein the lower chamber 92 contains hydraulic fluids and the upper chamber 94 contains gaseous substance under pressure. A thin, freely moving disc 96 separates the upper chamber from the lower chamber, thereby preventing the gas and fluid from coming into contact. The lower chamber is further divided by piston unit 98 which is movable, in turn causing to contraction and expansion of strut unit 91. Piston unit 98 is limited in its upward travel by partitioning plate 100, and disc 96 is limited in its downward travel also by the same plate. Right underneath plate 100 is upper hydraulic hose 102, supplying fluids under pressure in order to raise the vehicle's nose up.

On the bottom of strut unit 91 is the lower hydraulic hose 103 which supplies pressurized fluids to lower the vehicle's nose, in which case outgoing fluids will exit strut unit 91 via upper hose 102. It can be seen that because of plate 100, it is not possible for the gas in the upper chamber to accidentally exit out of strut unit 91 via hose 102, because disc 96 will move down to seal the potential exit route for the gas in upper chamber 94. When used as suspension means, both hoses 102 and 103 will be closed by appropriate hydraulic valve means (not shown), thereby allowing fluids from the upper surface of piston unit 98 to go through plate 100 via hole 104 when upward force is exerted on piston unit 98. The fluids will push disc 96 upward hence compressing against the gas in the upper chamber 94. Hole 104 serves as damping means for strut unit 91, allowing stiffer resistance of the strut unit 91 in respond to higher velocity shock. Metering rod 105 on top of piston unit 98 placed in alignment with hole 104 further restricting the orifice on hole 104 as piston unit 98 is closing in on plate 100, thereby further enhancing the shock absorption property of strut unit 91.

Figure 6A:
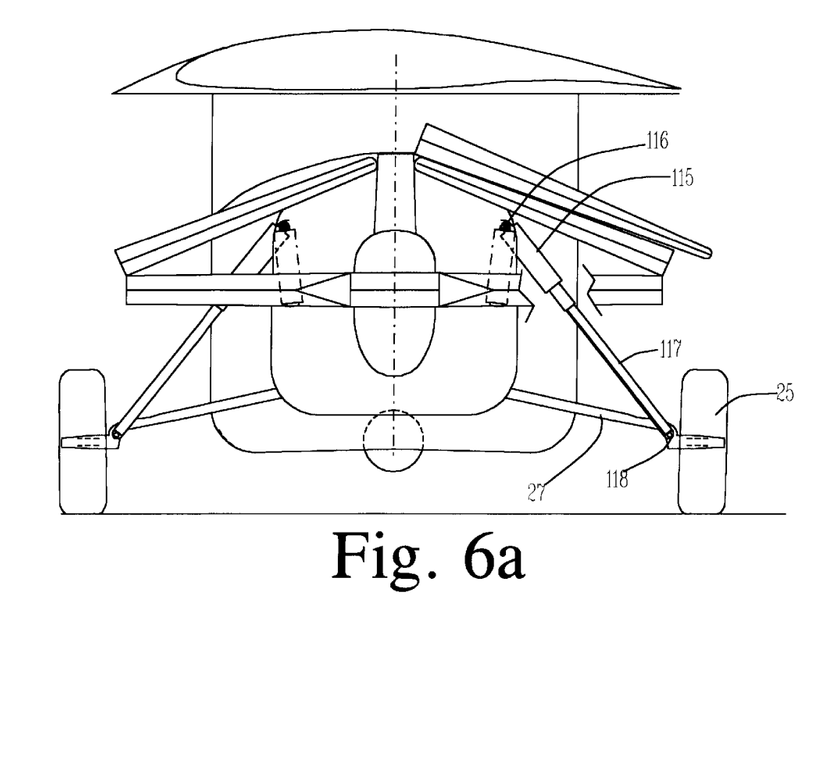
FIG. 6a shows details of the rear wheel suspension, anti-sway and shock absorption (damping) mechanism.
Figure 6B:
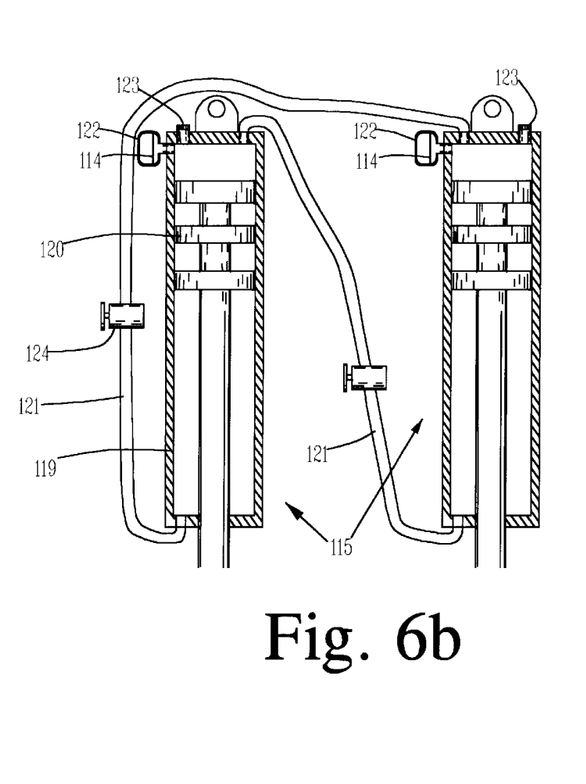
FIG. 6b shows internal construction of a pair of hydraulic piston and cylinder used for the purpose of shock absorption and as anti-sway mechanism.

Details for rear wheel suspension is illustrated in FIG. 6a and 6b. Since the rear wheels are not steerable and have no height-leveling mechanism, their suspension mechanism is much simpler than that of the front wheels. In FIG. 6a, the rear wheels 25 are mounted to the fuselage on landing gear legs 27 which are made from elastic tubular spring steel allowing them to act as suspension means. Shock absorption (damping means) is by shock struts 115 attached to the fuselage on hinges 116. The other ends of the shock strut 115 is threadedly connected to a hollow shaft 117, which is hingedly attached to the outer ends of leg 27 by hinge joint 118. In order to enable the rear wheels to be retractable into the fuselage inflight, the shock strut 115 must be disconnected by unscrewing its lower end from shaft 117, and then stowed inside the fuselage by pivoting on hinge 116 as shown in its alternate position by the phantom lines. Shaft 117 then may be disconnected from hinge 118 in order to be stored in the fuselage, or shaft 117 may simply be folded into landing gear leg 27 at hinge joint 118 and strapped onto leg 27 by an elastic strap (not shown).

Referring to FIG. 6b, a pair of shock struts 115 may also serve as rear wheel stabilizer means (anti-sway or anti-roll), since the use of a conventional U-shaped anti-sway bar as in automotive practice is very difficult with the retractable landing gear system in this vehicle. Additionally, saving in weight and cost can be realized with additional function for the shock struts 115. A pair of simple hydraulic cylinders 119 and pistons 120 is used with hydraulic hoses 121 attached to both ends of the cylinders. The bottom end of one cylinder 119 is hydraulically connected to the top end of the other cylinder, and vice-versa. When completely filled with hydraulic fluids, it can be seen that movement of the piston 120 in one shock strut unit 115 will cause a corresponding movement in the same direction by the piston of the other shock strut. The shock absorption property of the system is adjustable if an adjustable flow-restricting hydraulic valve 124 is installed on each hydraulic line 121. Near the top of each cylinder 119 there is attached a small chamber 122 normally filled with air. The air in this chamber 122 is hydraulically separated from the hydraulic fluids by diaphragm 114. This small amount of air will allow a small degree of spontaneity in movement of the shock strut 115 without impacting the opposite shock strut in response to high velocity, highly repetitive but low amplitude road shocks. For maintenance purpose, cap 123 on top of each cylinder 119 may be unscrewed in order for the fluids level to be checked and filled.

In order to serve as stabilizer (anti-sway) means for the front wheels, strut 115 may be placed side-by-side suspension strut 91 on each side, on top of lower control arm 21.

Figure 7:
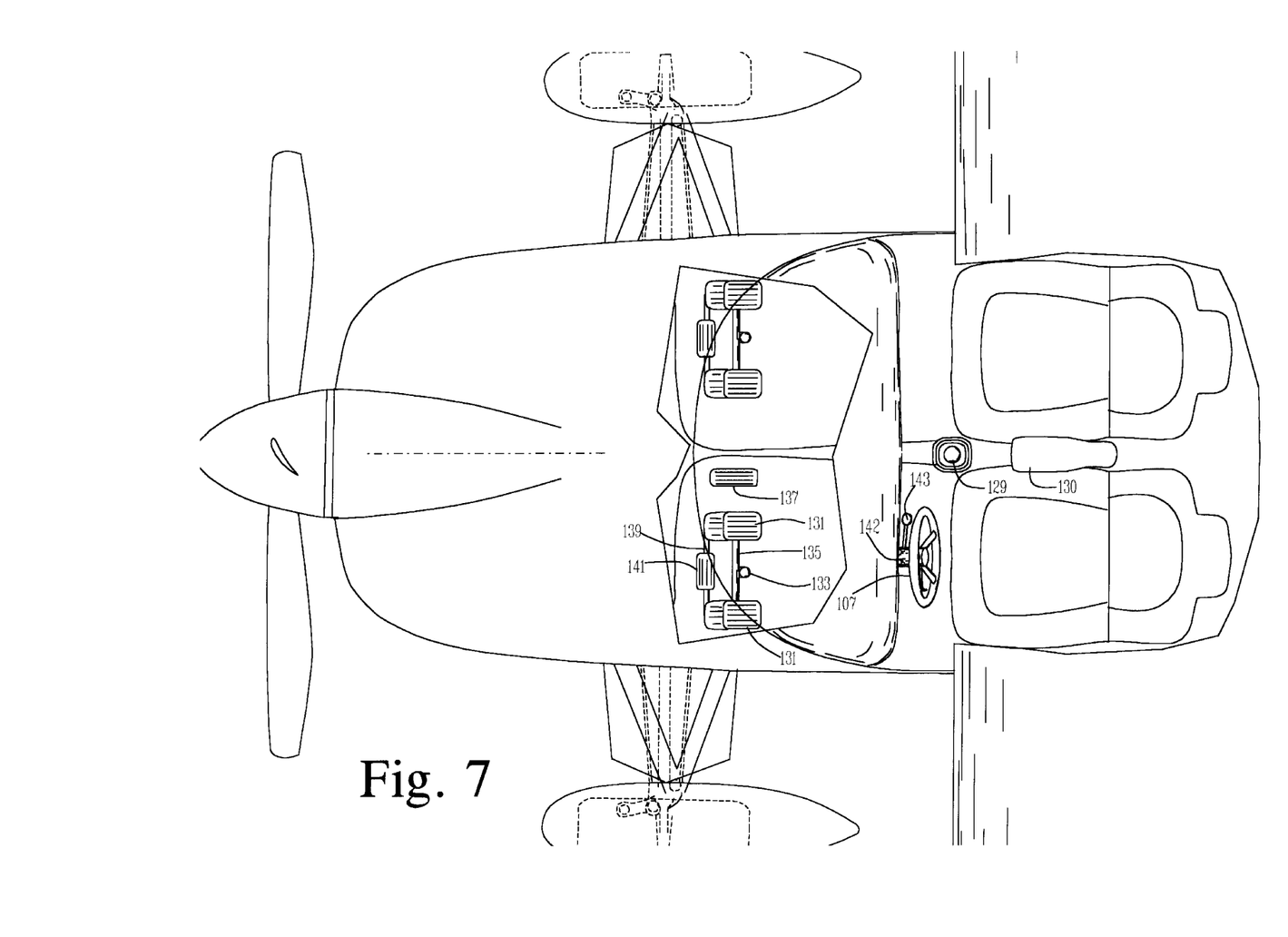
FIG. 7 is layout of the vehicle's cockpit control arrangement.

FIG. 7 shows the vehicle's cockpit layout. For safety and convenience, this air-ground vehicle must have cockpit control arrangement familiar to both automobile drivers and airplane pilots. In flight, pitch and roll control is by a joystick 129 in the center console between the two front seats. Alternatively, the joystick may be placed right in front of the pilot's seat as in fighter aircrafts. Rudder and brake control is via the two rudder pedals 131 placed in conventional aircraft cockpit position. The rudder pedals are horizontally pivotable on axis 133 for rudder control and they are pivotable vertically on axis 135 for differential toe braking as in conventional aircraft.

For braking while in roadable mode, either both feet may be used as in aircraft toe-braking action, as soon as the right foot is lifted off the gas pedal 137, or to comply more to conventional automotive practice of braking with only the right foot, the toe-ends of both rudder pedals 131 may be linked together by a metal bar 139, and right in the middle and on top of this metal bar 139 there placed a conventional automotive style brake pedal 141. If the latter method is chosen, the horizontal pivoting motion of the rudder pedals should be locked when the vehicle is in the roadable mode for a more positive feels during brake application. The use of differential toe braking action in the former method for the roadable mode is mechanically simpler and can provide additional steering control in case of emergency. As shown earlier, steering in the roadable mode is via conventional automotive style steering wheel 107 linked to conventional rack-and-pinion linkage to the front wheels, and gear change is by the transmission gear selector lever 143 as in automotive practice.

For manual transmission, a clutch pedal (not shown) should be provided in the usual automotive location. To accomplish this, the rudder-brake pedals and the accelerator pedal must be made smaller and closer together in order to "squeeze-in" the clutch pedal (not shown). Accordingly, instead of pivoting on axis 133, the rudder pedals will assume linear forward-backward motion so that they can be right next to each other. For one-foot braking in the roadable mode, a locking mechanism must be provided so as to bring the rudder pedals together, preventing forward-backward motion of the rudder pedals so that one-foot braking for both sides is still possible by pivoting on both rudder pedals simultaneously with one foot.

SUMMARY, RAMIFICATION AND SCOPE

Accordingly, the reader will see that the easily-convertible aircraft of this invention is not just an aircraft with speed and range comparable to other light aircrafts, but it has far greater utility than the conventional fixed-winged aircraft. Unlike most of the roadable aircraft designs of the prior art that must undergoes complex and time-consuming conversion from the roadable mode to the flight mode, this invention allows for easy and rapid conversion from roadable mode to flight mode within minutes, by a single person in an open field in wind exceeding 20 mph (32 kph), thus opens up far more traveling flexibilities than the current airport-dependent conventional aircraft. Far too many lifes have been lost when pilots of light aircrafts attempted to take off or land in unsuitable airport condition, such as in strong cross wind, too high terrain surrounding the airport, too low air density, poor weather etc. . . because the pilot simply has little choice. Pilots of an easily-convertible aircraft, on the other hand, simply drive to a more suitable location for take-off or landing at better airstrip and then driving to the final location, or simply drive on the highway until more suitable weather or geography is encountered.

While I have shown and described in considerable details what I believe to be the preferred form of my invention, it will be understood by those skilled in the art that the invention is not limited to such details but may take various other forms within the scope of the claims that follow. For example, the very simple and light-weight but highly effective wing folding and rotation arrangement may be utilized in a non-roadable aircraft for great reduction in hangar space hence storage cost, and in making the aircraft compact enough for ground towing or for transportation in a flat-bed truck trailer (similar to towing a recreational boat by a pick-up truck).

What is claimed is:

1. In a roadable flying vehicle designed to operate effectively both in the air and in the roadway, said vehicle having a center of gravity, a longitudinal axis, a fuselage with a cabin for housing an operator, a width, a top, a front end, and a rear end, the combination comprising:

front ground supporting means disposed at the front end of the vehicle, comprising of at least one steerable front wheel, rear ground supporting means mounted behind the center of gravity, comprising a pair of rear wheels, a vertical stabilizer means and a horizontal stabilizer means located at the rear end of the fuselage, an air propulsion means for propelling said vehicle while flying in the air, a wing comprising of a center panel and two outer panels foldably attached to said center panel by a wing folding mechanism allowing said outer panels to overlap on top of said center panel in a folded position, and allowing said outer panels to extend laterally from said center panel in an extended position, and, said wing is rotatably mounted on top of said fuselage on a wing pivot mechanism whereby said wing is horizontally rotatable between a flight position with the wing span approximately orthogonal to the fuselage's longitudinal axis and a roadable position with the wing span approximately parallel to the longitudinal axis of the fuselage, thereby allowing the vehicle to have a maximum width within legal limit for use in the roadway.

2. The vehicle of claim 1 further comprising a ground propulsion means mechanically linked to at least one of the wheels for continously propelling said vehicle while rolling in the roadway.

3. The air propulsion means of claim 1 further comprising an aircraft-type of propeller capable of rotation in a plane generally perpendicular to the longitudinal axis of the fuselage, said propeller is mounted in front of the fuselage.

4. The flying vehicle of claim 1 wherein the horizontal stabilizer means is comprised of an inner panel and an outer panel on each side, said outer panel is foldably mounted on said inner panel allowing said outer panel to overlap on top of said inner panel in a folded position, and allowing said outer panel to extend laterally outward from said inner panel in an extended position, thereby permitting the horizontal stabilizer to be reduced in span for roadability.

5. The flying vehicle of claim 1 wherein the vertical stabilizer means comprise of a upper panel and a lower panel, said upper panel is pivotably mounted on top of said lower panel allowing said upper panel to extend upward from said lower panel for flying, and allowing said upper panel to pivot to a nearly perpendicular position with respect to said lower panel in the roadable mode causing a reduction in vertical profile of the vertical stabilizer means, thereby improving stability in strong cross wind.

6. The vehicle of claim 1 wherein said front ground supporting means further comprising of nose-height leveling means controllable by the operator, whereby the front end of the vehicle may be raised off the ground for adequate propeller clearance and at an angle sufficient for take off into the air at reasonable airspeed, and whereby the front end of the vehicle may be lowered in order to improve ground visibility and to prevent undesirable aerodynamic lift while operating in the roadway.

7. The front ground-supporting means of claim 6 wherein steering, suspension, shock absorption and nose-height leveling actions are accomplished by mechanism analogous to the well known short-long arm suspension common in automotive practice, comprising:

a pair long control arms each having an outer end, each of said control arm is disposed in a symmetrically spaced-apart relationship with the longitudinal axis of the vehicle, a pair of wheels, each of said wheels is mounted on a steering knuckle having an upper ball joint and a lower ball joint, a pair of said steering knuckles is swivelingly attached to a respective outer end of said long control arms, a pair of V-shaped short control arms, each of said short control arm is articulatedly attached to the upper ball joint of said steering knuckle on respective side, suspension, shock absorption and lifting strut means connecting the long control arm to the fuselage, said suspension, shock absorption and lifting strut means comprises a telescopic strut with a length, whereby the length of said strut is controllable by the vehicle's operator, and, a plurality of hinge joints connecting the long control arms and short control arms to the fuselage thereby allowing large vertical displacement of the front wheels with minimum change in wheel camber.

8. The vehicle of claim 1 wherein the ground supporting means further comprise of anti-sway means whereby upward displacement of the wheel on one side of the vehicle causes a corresponding upward displacement of the wheel on the other side of the vehicle, thereby preventing excessive leaning of the vehicle in a tight turn that may lead to a complete roll-over.

9. The vehicle of claim 1 wherein the rear ground supporting means is retractable into the fuselage, further comprises of:

a pair of landing gear legs each having an outer end protruding significantly outside of the fuselage's width, said landing gear legs are made of elastic material thereby serving also as suspension means, a pair of wheels rotatably mounted on each outer end of said landing gear legs, landing gear retraction means for completely retracting said rear ground support means into the fuselage while in flight, and, shock absorption means and anti-sway means combined in a hydraulic strut means, thereby allowing for energy absorption of the rear wheels in rough road condition as well as preventing excessive leaning or swaying of the vehicle in a tight turn that can lead to complete roll-over.

10. The hydraulic strut means of claim 9 comprises of:
a pair of hydraulic struts filled with hydraulic fluids, each one of said strut is disposed on a lateral side of the vehicle,
each of said strut is removably connected from the outer end of the landing gear leg to the respective lateral side of the fuselage
each of said strut having a piston and a cylinder, wherein said piston partitions said cylinder into a top compartment and a bottom compartment,
pressure hose means with a flow-restricting means hydraulically connecting the top compartment of one strut to the bottom compartment of the other strut on the other side of the vehicle, and vice versa, thereby causing simultaneous shock absorption by virtues of the flow-restricting means and anti-sway property since upward force on one strut causes similar upward force on the other strut causing upward movement of the wheel on each side simultaneously.

11. The wing pivot mechanism of claim 1, disposed on top of the fuselage, further comprises:
a wing rotational axis extending vertically through the top of the fuselage,
rotational axis bearing means surrounding said wing rotational axis capable of supporting the wing in its entirety during wing rotation, allowing for low-friction wing rotation,
releasable wing locking means for tightly securing the wing to the fuselage in both the flight position and the roadable position, said locking means are distributed in radially spaced-apart positions at regular intervals from the wing rotation axis on top of the fuselage,
resilient sealing means sandwiched between the wing and the top of the fuselage in order to seal any potential air gaps between the fuselage and the wing and to restrict transmission of vibration between the fuselage and the wing,
wing lifting means mounted nearby the wing rotational axis for lifting the wing up from the fuselage thereby unseating the wing from the sealing means prior to wing rotation, and
wing rotation means for powering the wing rotation between the flight position and roadable position.

12. The wing pivot mechanism of claim 11 wherein the axis bearing means, wing lifting means and wing rotation means further comprises:
a smooth rod protruding through the rotational axis of said wing from underneath the wing for entirely supporting said wing during wing rotation, said smooth rod has a top end and a bottom end,
said smooth rod rotatably protrudes its top end through a channel formed inside said wing,
said smooth rod is rotatably supported on its bottom end by being mounted on top of a wing lifting means mounted on a fuselage structure, said wing lifting means is capable of lifting the entire wing off the fuselage thereby providing clearance for wing rotation,
whereas the wing rotation means is accomplished manually by force of the operator's arm pushing against an edge of the wing.

13. The wing lifting means of claim 11 or claim 12 further comprises:
a round plate disposed underneath the wing, said round plate is fixedly mounted on top of a threaded rod,
said threaded rod having a lower end, is threadedly journaled through a correspondingly threaded bearing inserted into a fuselage cross-beam on top of the fuselage,
the lower end of said threaded rod is fixedly attached to a hand crank, whereby cranking a few turns on said crank will cause a slight vertical movement of the wing with respect to the fuselage.

14. The wing pivot mechanism of claim 11 wherein each of the releasable wing locking means is comprised of a bolt with a threaded end journaled through a fuselage frame structure and screwed to a correspondingly threaded recess inside the wing.

15. The wing folding mechanism of claim 1 for joining the wing's center panel and outer panels, each of said panel having a top surface and a bottom surface, further comprising:
hinge means for pivotably joining said center panel to said outer panel, said hinge means is disposed on the top surface of said panels,
locking means disposed on the bottom surface of said panels, for securing said outer panel to said center panel in the extended position,
said locking means comprises of a slidably mounted locking pin traversing through correspondingly holed flanges, said flanges protrude from the bottom surface of adjoining center panel and outer panel, thereby holding both panels together.

16. The vehicle of claim 1 further comprises of a remote vision-sensing means mounted generally in the front end of the fuselage, said vision-sensing means relays visual image to a visual display means mounted inside the cabin within visual glance of the operator, thereby allowing improved external visibility, especially upwardly where blocked by the wing in the roadable configuration.

17. The vehicle of claim 1 further comprises of:
at least one main fuel tank locates near the center of gravity,
an additional fuel tank for storage of reserved fuel capacity that is not planned on being used during routine flight, said additional fuel tank is disposed significantly at the rear end of the fuselage, and,
pumping means for moving fuel between said main fuel tank and said additional fuel tank, thereby allowing for compensation of undesirable shift in the center of gravity location as the result of various loading condition of the vehicle.

18. In an aircraft having a wing and a fuselage with a longitudinal axis, said wing being rotatable on a wing pivot mechanism between a flight position with the wing span generally orthogonal to the fuselage longitudinal axis and a stowed position with the wing span generally parallel to the longitudinal axis of the fuselage, said wing pivot mechanism comprising:
a wing rotational axis,
a smooth rod protruding through the rotational axis of said wing from underneath the wing for entirely supporting said wing during wing rotation, said rod has a top end and a bottom end,
said smooth rod rotatably protrudes its top end through a channel formed inside said wing,
said smooth rod is rotatably supported on the bottom end by being mounted on top of a wing lifting means for providing clearance for wing rotation, said wing lifting means further comprises:

a round plate underneath the wing, said round plate is fixedly mounted on top of a threaded rod, said threaded rod having a lower end, is threadedly journaled through a correspondingly threaded bearing inserted into a fuselage structure on top of the fuselage, the lower end of said threaded rod is fixedly attached to a hand crank, whereby cranking a few turns on said crank will cause a slight vertical movement of the wing with respect to the fuselage, whereas the wing rotation means is accomplished manually by force of the operator's arm pushing against an edge of the wing, resilient sealing means sandwiched between the wing and the top of the fuselage in order to seal any potential air gap between the fuselage and the wing and to restrict transmission of vibration between the fuselage and the wing, releasable wing locking means for tightly securing the wing to the fuselage in both the flight position and the stowed position, said locking means are disposed in radially spaced-apart positions at regular intervals from the wing rotation axis on top of the fuselage, comprising a bolt with a threaded end traversing through a fuselage frame structure and screwed to a correspondingly threaded recess inside the wing.

* * * * *